United States Patent
Bialy et al.

[15] 3,652,238
[45] Mar. 28, 1972

[54] ANTI-STATIC FUEL COMPOSITION

[72] Inventors: Jerzy J. Bialy, Lagrangeville; William R. Siegart, Poughkeepsie, both of N.Y.; William D. Blackley, Lake Elmo, Minn.; Harry Chafetz, Poughkeepsie, N.Y.

[73] Assignee: Texaco Inc., New York, N.Y.

[22] Filed: Aug. 6, 1970

[21] Appl. No.: 61,796

Related U.S. Application Data

[63] Continuation-in-part of Ser. No. 873,706, Nov. 3, 1969, abandoned.

[52] U.S. Cl. ......................................................44/62, 44/72
[51] Int. Cl. .........................................C10l 1/20, C10l 1/22
[58] Field of Search..............44/72, 62, DIG. 2; 260/93.5 A, 260/94.9 H

[56] References Cited

UNITED STATES PATENTS 3,003,858  10/1961  Andress et al. ............................44/62
3,461,162  8/1969  Koshar et al. ..........................44/72 X Primary Examiner—Daniel E. Wyman
Assistant Examiner—W. J. Shine
Attorney—Thomas H. Whaley and Carl G. Ries

[57] ABSTRACT

Antistatic fuel composition comprising a mixture of hydrocarbons in the gasoline, kerosene and/or furnace oil boiling ranges and a minor amount of a reaction product of an aliphatic monoamine having the formula $RNH_2$ in which R is an aliphatic radical having from eight to 20 carbon atoms and either a fluorinated polystyrene having the empirical formula:

$(C_{16}H_3F_{25})_x$ in which $x$ is an average integer between 3 to 5, or a fluorinated polypropylene having the empirical formula:

$(C_3HF_5)_x$ in which $x$ has a value from 20 to 40, and a method for preparing the above-noted aliphatic monoamine derivatives.

11 Claims, No Drawings

ANTISTATIC FUEL COMPOSITION

This application is a continuation-in part of application, Ser. No. 873,706 filed Nov. 3, 1969 now abandoned.

BACKGROUND OF THE INVENTION

1. Field of Invention

Distillate hydrocarbon fractions, such as gasoline, kerosene, diesel oil and furnace oil, are inflammable to highly inflammable materials and must be protected from accidental ignition. Another property of these fuels is that they are relatively non-conductive with respect to electricity.

Very large volumes of liquid hydrocarbon fuels, i.e. gasoline, kerosene, diesel oil and furnace oil, are transferred daily through pipelines, hoses and like equipment. Because the volumes are so great, many of these operations are conducted using high velocity pumping means as in the loading of ships, storage tanks and aircraft. Because of the non-conductive nature of these normally liquid hydrocarbons, static electricity builds up and accumulates in the fuel during the high speed pumping operations. This static electricity build-up is inherently dangerous and is known to have caused disastrous fires and explosions in the past.

The present invention is directed to a novel fuel composition having improved electrical conductivity and, therefore, anti-static in nature. This invention is also directed to a novel method for preparing the anti-static additive.

2. Description of the Prior Art

Fluorinated hydrocarbons including fluorinated polystyrene and fluorinated polyolefins are well known in the art. Fluorinated polystyrene having the empirical formula $(C_{16}H_3F_{25})x$ where $x$ is 3 to 5 and a method for preparing these compounds is disclosed in U.S. Pat. No. 3,380,983. According to this patent, a fluorinated polystyrene is prepared by contacting a polystyrene having a molecular weight between about 10,000 and 500,000 with gaseous fluorine in the presence of an alkali metal fluoride catalyst at a temperature between about 20° and 105° C. The resulting products have the empirical formula $(C_{16}H_3F_{25})x$ where $x$ is 3 to 5 and having a melting point of 85° to 90° C.

A specific fluorinated styrene disclosed in the patent (Example II) is represented by the empirical formula:

$$(C_{16}H_3F_{25})_{3.87}$$

has a molecular weight of 2,590 and a melting point of 85°–90° C. This fluorinated polystyrene comprises a mixture of telomeric compounds of varying chain length having an average of 3-87 repeating units where each repeating $C_{16}H_3F_{25}$ unit in the chain consists of two chemically fluorinated cyclohexane analogs of styrene.

U.S. Pat. No. 3,013,868 discloses a liquid hydrocarbon composition having increased electrical conductivity due to the incorporation of a conductive additive to the liquid consisting of a salt of a metal having an atomic number from 22 through 28 and a high molecular weight aromatic, carboxylic or sulfuric acid. Specific conductivity additives are chromic diisopropyl salicylate, chromic dioctyl sulfosuccinate and vanadium petroleum sulfonate. This reference also discloses that the effectiveness of the conductivity additives can be improved by the further addition of salts of nitrogen-containing copolymers.

SUMMARY OF THE INVENTION

The anti-static fuel composition of the invention comprises a mixture of hydrocarbons in the gasoline, kerosene, diesel oil and furnace oil boiling ranges containing a minor amount of an aliphatic monoamine reaction product of either a fluorinated polystyrene or a fluorinated polypropylene. More specifically, the fuel composition, which will generally boil from about 90° to about 750° F., contains an effective anti-static amount of an aliphatic monoamine reaction product of an aliphatic monoamine having the formula $RNH_2$ in which R is an aliphatic radical having from eight to 20 carbon atoms and either a fluorinated polystyrene represented by the empirical formula:

$$(C_{16}H_3F_{25})X$$

in which $x$ is an average integer of between 3 to 5, or a fluorinated polypropylene represented by the empirical formula:

$$(C_3HF_5)_x$$

in which $x$ has a value from 20 to 40. The method for preparing the aliphatic monoamine reaction product involves the reaction of the corresponding fluorinated polymer with a primary aliphatic monoamine at a temperature in the range of 50° to 200° C. and in the presence of a tertiary amine catalyst, such as a trialkylamine having the formula $R_3N$ in which R is the same or different aliphatic radicals having from one to 30 carbon atoms.

The preparation of the fluorinated polystyrene component of the reaction product of the invention having the empirical formula $(C_{16}H_3F_{25})x$ in which $x$ is an average integer between 3 to 5 is fully described in U.S. Pat. No. 3,380,983 referred to above.

The fluorinated polypropylene component of the reaction product of the invention was prepared in essentially the same process used for the fluorinated polystyrene. In general, a solid polypropylene having a specific gravity from about 0.880 to 0.908 is deposited on sodium floride and dried and ground in a mill to pass through a 1 mm. screen. The treated polypropylene is charged to a reactor and the reaction mixture chilled. Fluorine diluted with nitrogen is added to the stirred reaction mixture until fluorine is detected coming from the reactor. The reaction is then continued at room temperature until fluorine is detected coming from the reactor at which time the reactor is heated to an elevated temperature about 85° C. and the reaction continued until fluorine issues from the reactor. The reactor is flushed with nitrogen and the fluorinated polypropylene recovered by solvent extraction as disclosed in the above-noted patent. The fluorinated polypropylene product has the empirical formula $(C_3HF_5)_x$ in which $x$ has a value from about 20 to 40 preferably from 23 to 35.

The following example illustrates the preparation of the fluorinated polypropylene of the invention:

EXAMPLE I

Thirty grams of polypropylene having a specific gravity of 0.905 and a crystalline melting point of 333° F. was dissolved in 500 ml. of boiling cumene and 265 grams of sodium fluoride added to the solution. The suspension was cooled to room temperature, filtered, washed with ether, and dried. The solids were ground in a mill to pass through a 1 mm. screen, again washed with ether, dried, and charged to a reactor. Fluorine diluted with nitrogen was passed into the reactor, which was cooled in an ice bath, until a positive fluorine test was obtained at the exit end of the reactor. The fluorination was then continued with the reactor at room temperature until a positive fluorine test was obtained at the reactor exit. Heat was then applied and the reaction continued. The fluorination was terminated when the reactor skin temperature was 85° C. and a positive fluorine test was obtained at the reactor exit. The reactor was flushed with nitrogen and the solids removed from the reactor and extracted twice with 800 ml. portions Freon 113. The Freon was removed under reduced pressure to yield 75.5 grams of fluorinated polypropylene having a molecular weight of about 4612 and the following analysis:

Carbon, wt percent    25.2
Hydrogen, wt percent    0.4
Fluorine, wt percent    74.1

The fluorinated polystyrene and fluorinated polypropylene noted above are reacted with an aliphatic monoamine to form the corresponding amine reaction product which provides anti-static properties in the distillate hydrocarbon fuel oil composition. In general, this method involves the reaction of a fluorinated polymer containing at least one unsubstituted hydrogen atom with a primary aliphatic monoamine having the formula:

$RNH_2$ in which R is an aliphatic radical having from about eight to 20 carbon atoms, the reaction being conducted in the presence of a tertiary amine catalyst. This reaction is generally conducted at a temperature in the range of 50° to 200° C. and preferably at a temperature from 80° to 150° C.

Examples of primary and secondary aliphatic monoamines which can be employed in this reaction include octylamine, decylamine, dodecylamine, tetradecylamine, hexadecylamine and octadecylamine; dodecylamine and octadecylamine being particularly preferred.

The tertiary amine catalysts which can be employed in the reaction include trimethylamine, triethylamine, tripropylamine, tributylamine, triamylamine, trioctylamine, pyridine, pyrimidine, pyrazine and the like. In general, the catalyst can be represented by the formula $R_3N$ where R is a hydrocarbon radical, preferably an alkyl radical having from one to 30 carbon atoms. It is also understood that the R's can be connected to form a cyclic tertiary amine compound.

The reaction is conducted using approximately one equivalent of the aliphatic monoamine and two equivalents of the tertiary amine catalyst for each hydrogen atom in the fluorinated polymer.

The following examples illustrate the preparation of the aliphatic monoamine-fluorinated polymer reaction products of this invention.

EXAMPLE II

PREPARATION OF THE DODECYLAMINE DERIVATIVE OF FLUORINATED POLYSTYRENE

Into a reaction flask was charged 95.0 grams of triethylamine, 50.3 grams of fluorinated polystyrene having the formula $(C_{16}H_3F_{25})_{3.87}$ from U.S. Pat. No. 3,380,983, 83.3 grams of dodecylamine and 100 cc. of 1,4-dioxane. The mixture was stirred together at reflux for 16 hours, cooled to room temperature and filtered. The solvent was removed from the filtrate under water asperator vacuum to yield 101 grams of a solid residue. This was extracted with 600 ml. of pentane and filtered. The pentane solution was extracted with two 500 ml. portions of water and with two 600 ml. portions of a 50:50 methanol-water mixture. The pentane was removed from the solution under vacuum and 78.0 grams of product was isolated. Infrared analysis of the product confirmed that it was an amine reaction product of the fluorinated polystyrene. The product was a black viscous liquid having the following elemental analysis:

%C = 64.1
%H = 8.3
%N = 4.4

EXAMPLE III

OCTODECYLAMINE DERIVATIVE OF FLUORINATED POLYPROPYLENE

Into a reaction flask was charged 102 grams of octadecylamine, 80.0 grams triethylamine, 200 cc. of 1,4-dioxane and 50.0 grams of the fluorinated polypropylene of Example I. This reaction mixture was stirred together at reflux for 16 hours and cooled to room temperature. Two Hundred cc. of pentane was added and the mixture filtered. The solids were extracted with an additional 500 cc. of pentane and the filtrates were combined. The solvent was removed under water asperator vacuum and the product extracted with two 300 ml. portions of pentane. The pentane was removed under vacuum and the resulting solid product extracted with two 500 ml. portions of ethyl alcohol and dried. A yield of 83.1 grams of a black solid melting at 38°C. was obtained. Infrared analysis taken in Nujol and fluorolube mulls confirmed that the product was the amine derivative of fluorinated polypropylene and that olefin was present in the chemical structure. The product analyzed as follows:

% Carbon = 64.9 check 65.1
% Hydrogen = 9.0 check 9.1
% Fluorine = 20.5 check 20.9

Molecular weight = 2,430

EXAMPLE IV

OCTADECYLAMINE DERIVATIVE OF FLUORINATED POLYSTYRENE

Into a reaction flask was charged 50.0 grams of triethylamine, 50.3 grams of fluorinated polystyrene having the formula $(C_{16}H_3F_{25})_{3.87}$, 61.7 grams of octadecylamine and 200 cc. of 1,4-dioxane. These materials were refluxed with stirring for 16 hours. The reaction product was removed from the flask, 300 cc. of benzene added, and the mixture filtered. The solvent was removed from the filtrate under vacuum, 500 ml. of pentane added to the residue, and the mixture filtered. The pentane was removed from the filtrate under vacuum and the residue was extracted first with two 250 ml. portions of methyl alcohol and then with two 500 cc. portions of methyl alcohol and dried. A yield of 71 grams of a tacky, gum-like solid with a melting point of 35°–40° C. was obtained. Infrared analysis showed characteristic infrared bands for amine, CH, olefin, CF, and cyclohexane absorption (such as shown by fluorinated polystyrene). Elemental analysis of the products was as follows:

% Carbon = 65.3
% Hydrogen = 8.8
% Nitrogen = 3.1
Molecular weight = 2,148

EXAMPLE V

DODECYLAMINE DERIVATIVE OF FLUORINATED POLYPROPYLENE

Into a reaction flask was charged 70.0 grams of dodecylamine, 75.0 grams triethylamine, 200 cc. of 1,4-dioxane and 45.0 grams of the fluorinated polypropylene of Example I. The reaction mixture was stirred at reflux for 16 hours, then cooled and filtered. The solvent was removed under vacuum, and the resulting product extracted with 200 ml. portions of pentane. The pentane removed under vacuum and a viscous black residue extracted with two 200 ml. portions of 95 percent ethyl alcohol. The insoluble material remaining was dried to yield 59.7 grams of a black, viscous liquid. Infrared analysis of the material showed it to be an amine derivative of the fluorocarbon with strong olefin absorption. Elemental analysis showed:

%C = 61.0
%H = 7.8
%N = 4.7
%F = 21.0
Molecular weight = 2174

The hydrocarbon base fuel for the fuel composition of the invention is any distillate hydrocarbon or mixture of hydrocarbons in the gasoline, kerosene, diesel oil and/or furnace oil boiling ranges. In general, these normally liquid hydrocarbon fractions boil in the range from about 90° to 750° F. The hydrocarbon mixture may consist of saturated and unsaturated aliphatic, cycloaliphatic and aromatic hydrocarbons within the noted boiling range. Specific fractions which can be employed for preparing the fuel compositions of the invention include gasoline boiling from about 90° to 425° F., kerosene boiling from about 300° to 525° F., gas oil and diesel oils boiling from about 390° to 750° F. and furnace oils boiling from about 300° to 750° F. or higher.

The anti-static fuel composition of the invention is prepared by blending a minor anti-static effective amount of the above-described additives to the base fuel. In general, the anti-static additive is employed at a very low concentration ranging from about 0.01 to 1000 p.p.m. (weight parts per million parts of fuel). A preferred concentration range is from about 0.05 to 25 p.p.m., with the most preferred range being from 0.1 to 10 p.p.m.

The electrical conductivity or anti-static properties of the base fuel and of the fuel compositions of the invention were determined in a Resistivity Test according to ASTM Method D1169–64. In this test, the resistivity of fuel is tested by the electrical conductivity found between two electrodes immersed in the fuel samples.

The base fuel employed in these tests was a typical turbine or jet fuel having the following inspection values:

| | |
|---|---|
| API Grav., at 60° F. | 43.4 |
| ASTM Dist., | |
| IBP °F. | 334 |
| 10% | 362 |
| 30 | 382 |
| 50 | 404 |
| 70 | 432 |
| 90 | 466 |
| 95 | 488 |
| E.P. | 511 |
| Net Heat of Comb., BTU/lb. | 18,438 |
| Luminometer No. | 51.0 |
| Freezing Point, °F. | –64 |
| Net Heat of Combustion, BTU/gallon | 124,200 |

The electrical conductivity of the fuel compositions expressed in Resistance in ohm-cm. is set forth in the following table. The additive concentration employed was 1 p.p.m.

TABLE I

| Run | Additive | Resistance ohm-cm. |
|---|---|---|
| 1 | None—base fuel | $2,662 \times 10^{12}$ |
| 2 | Example II | $8.3 \times 10^{12}$ |
| 3 | Example III | $14.5 \times 10^{12}$ |
| 4 | Example IV | $8 \times 10^{12}$ |
| 5 | Example V | $8 \times 10^{12}$ |
| 6 | Commercial additive | $130 \times 10^{12}$ |

It is evident from the data that the anti-static fuel composition of the invention is highly effective for improving the electrical conductivity of the hydrocarbon base fuel. These fuel compositions are superior in their anti-static properties to a fuel composition containing a commercial anti-static additive at the same concentration level.

Obviously, many modifications and variations of the invention, as hereinbefore set forth, may be made without departing from the spirit and scope thereof, and therefore, only such limitations should be imposed as are indicated in the appended claims.

We claim:

1. A fuel composition comprising a mixture of liquid hydrocarbons boiling from about 90° to 750° F. containing a minor antistatic effective amount of a reaction product of an amine and a fluorinated polymer having at least one unsubstituted hydrogen atom from the group consisting of fluorinated polystyrene and fluorinated polypropylene, said aliphatic monoamine having the formula:

$$RNH_2$$

in which R is a radical having from eight to 20 carbon atoms, said reaction being conducted between at least one unsubstituted hydrogen atom in said fluorinated polymer and said aliphatic monoamine in the presence of two equivalents of tertiary amine catalyst for each hydrogen reacted in said fluorinated polymer, said tertiary amine being represented by the formula:

$$R_3N$$

wherein R is a hydrocarbon radical having from one to 30 carbon atoms, said reaction being effected at a temperature from about 50° to 200° C.

2. A fuel composition according to claim 1 in which the hydrocarbons are in the gasoline or kerosene boiling ranges or mixtures thereof.

3. A fuel composition according to claim 1 in which the mixture of hydrocarbons are in the furnace oil boiling range.

4. A fuel composition according to claim 1 containing from about 0.01 to 1000 weight parts per million parts of said reaction product of said amine and said fluorinated polymer.

5. A fuel composition according to claim 1 in which said fluorinated polystyrene has the empirical formula:

$$(C_{16}H_3F_{25})_x$$

where $x$ is an average integer of between 3 to 5, and said fluorinated polypropylene has the formula:

$$(C_3HF_5)_x$$

where $x$ has a value from 20 to 40.

6. A fuel composition according to claim 5 in which said fluorinated polystyrene has the formula:

$$(C_{16}H_3F_{25})_{3.87}$$

7. A fuel composition according to claim 5 in which said amine is dodecylamine.

8. A fuel composition according to claim 5 in which amine is octadecylamine.

9. A fuel composition according to claim 5 in which said fluorinated polypropylene has the empirical formula:

$$(C_3HF_5)_x$$

in which $x$ has a value from 23 to 35.

10. A fuel composition according to claim 9 in which amine is dodecylamine.

11. A fuel composition according to claim 9 in which said amine is octadecylamine.

* * * * *